United States Patent

[11] 3,583,440

| [72] | Inventor | Sven E. Andersson<br>480 Halsted Ave., #6Y, Harrison, N.Y. 10528 |
|---|---|---|
| [21] | Appl. No. | 779,007 |
| [22] | Filed | Nov. 26, 1968 |
| [45] | Patented | June 8, 1971 |

[54] AUTOMATIC METERING VALVE
4 Claims, 8 Drawing Figs.

[52] U.S. Cl. .................................................... 137/624.14,
137/509, 137/510, 251/15, 251/48
[51] Int. Cl. .................................................... F16k 31/12,
F16k 21/04
[50] Field of Search .......................................... 137/509,
510, 624.14; 251/15, 24, 48

[56] References Cited
UNITED STATES PATENTS

| 2,580,433 | 1/1952 | Kain | 137/624.14 |
| 2,650,615 | 9/1953 | Nesham | 137/624.14 |
| 3,216,328 | 11/1965 | Peterson | 137/624.14X |

*Primary Examiner*—Robert G. Nilson
*Attorney*—Carl Miller

ABSTRACT: A control valve for use in a pipe line conveying any pressure media such as gas, water, oil, etc., operating by differential pressure established in the valve. The control valve embodies a casing having an inlet and an outlet for the media to flow therethrough, and provided within the casing is a cylinder chamber having a movable piston therein. A piston rod extends from one side of the piston and carries at its free end a valve element arranged to seat in the casing outlet to block the flow of the media therethrough. The cylinder provides a chamber on the other side of the piston filled with air under atmospheric pressure. An air inlet and discharge valved conduit is connected to the cylinder chamber adjacent its end wall opposite the piston, the valved conduit including an adjustable valve settable to meter the inlet of air at a predetermined rate into the chamber and a spring pressed valve that is opened to discharge the air from the cylinder chamber when the piston moves therein to expel the air in the chamber. The difference in surface area between the piston and valve carried by the piston rod establishes a differential pressure such that when the pressure in the media exceeds a predetermined limit the differential pressure will act on the piston to move the same inwardly into the cylinder chamber to expel the air therefrom, thus opening the valve the setting of the adjustable valve in the air inlet and discharge valved conduit controls the time for the air to flow into the cylinder chamber and thus to control the outward movement of the piston and the closing of the control valve. This operation is entirely automatic. In lieu of the use of the air inlet and discharge valved conduit the exit and admission of air to the air cylinder chamber of the control valve may be controlled by a manually operated valve or by solenoid operated valves in an air line remote from the control valve.

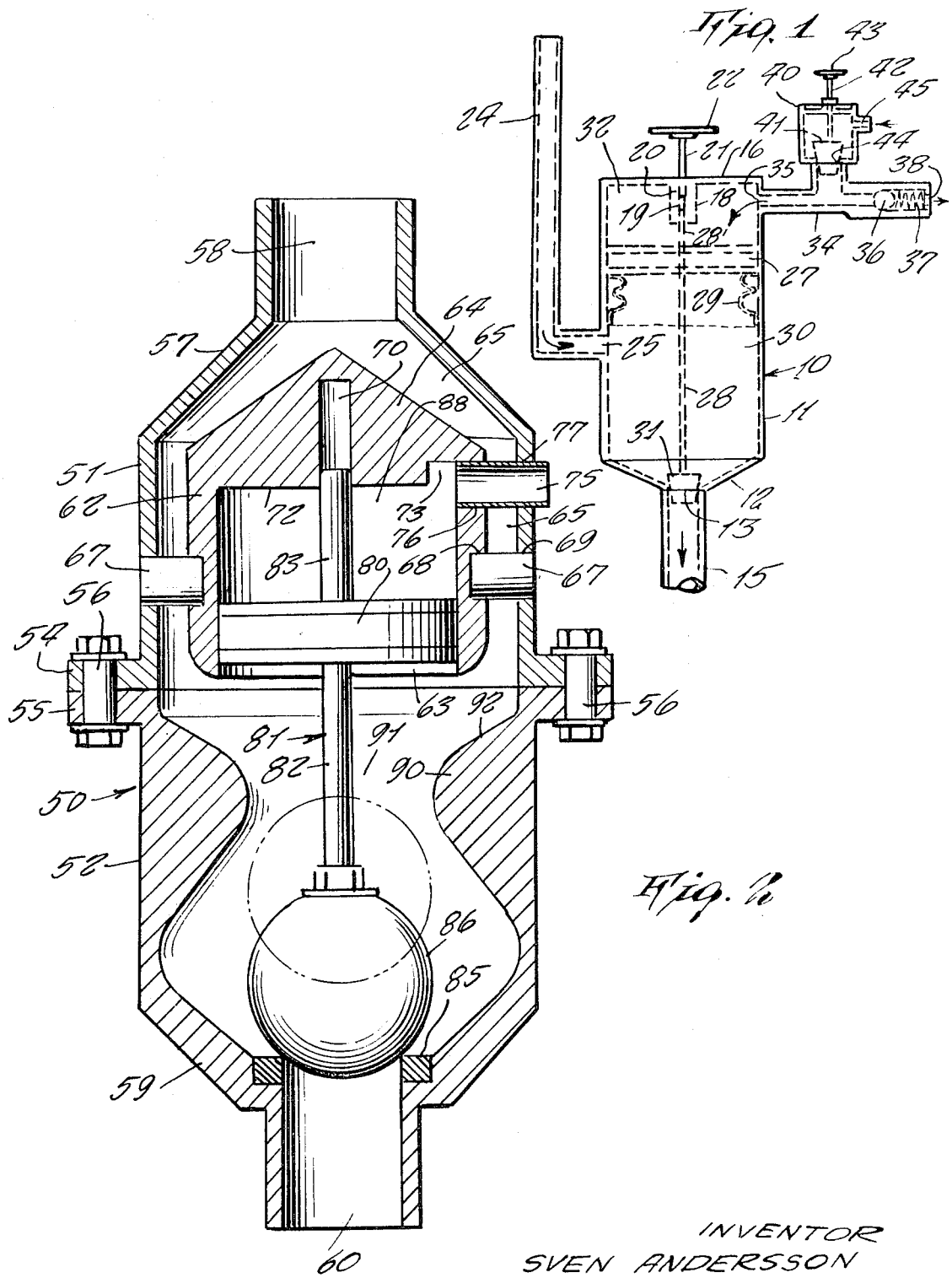

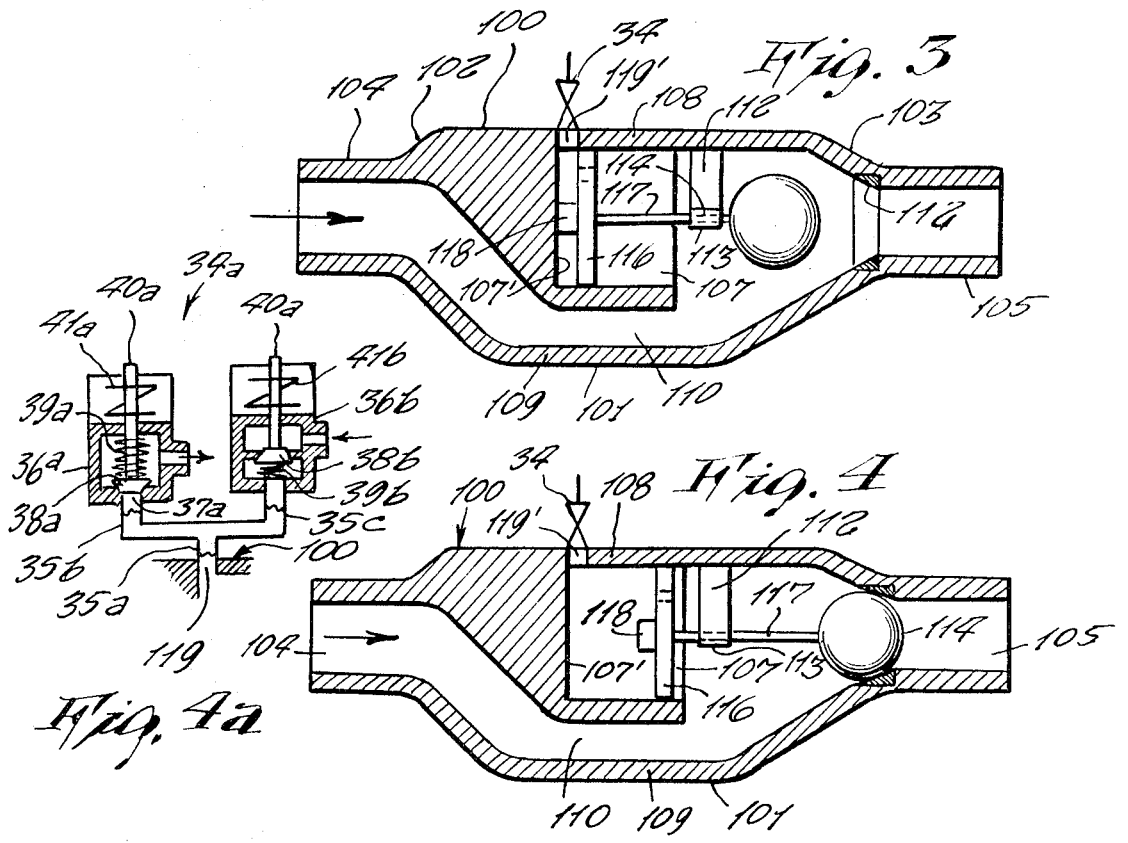
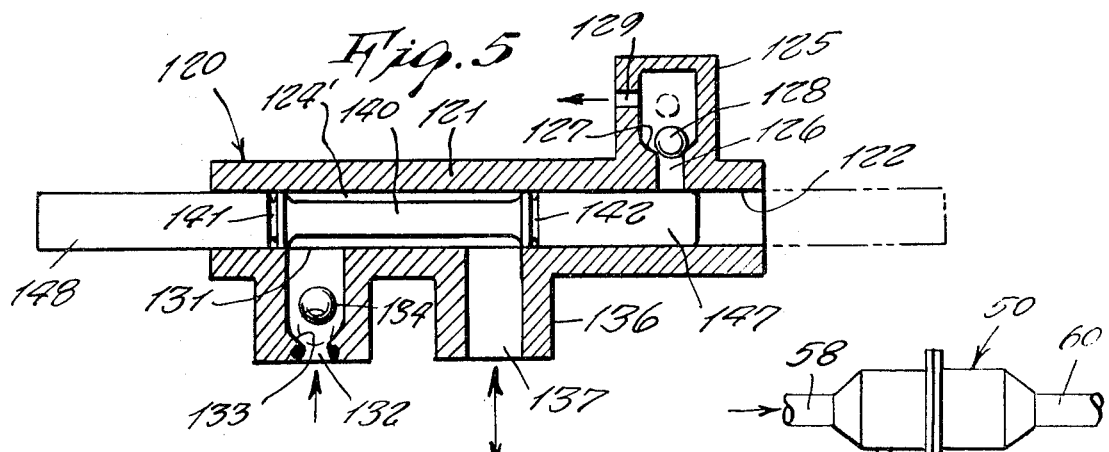
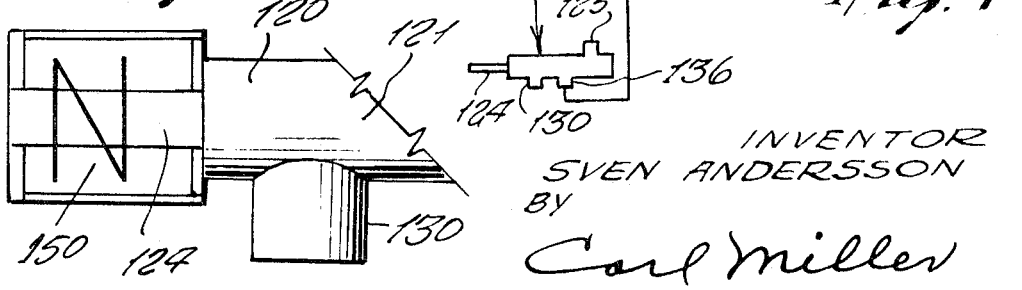

AUTOMATIC METERING VALVE

This invention relates to a pressure control valve in a pipe line carrying a media under pressure, either a gas or a liquid, and has for its primary object the provision of a multivalved structure automatically operative to open or close the pipe line, the operation of the same being effected by differential pressure.

Another object of this invention relates to employing with the control valve where variable metering is desired or a hazardous atmosphere or a highly inflammable media is handled, a remote manual or solenoid operative mechanism for operating the control valve.

Still another object of this invention is to provide a control valve casing having an inlet conduit and a discharge conduit including therewithin an air cylinder chamber having a piston reciprocating therein, the piston having a rod or stem carrying a valve for closing the discharge conduit.

Yet another object of this invention is to provide the air cylinder chamber with an exhaust port to which is connected an air inlet and discharge valved conduit unit having a spring pressed valve that is opened when the air within the air cylinder chamber is expelled by movement of the piston, and an adjustable air inlet valve that will admit air at a determined time interval into the air cylinder chamber as the piston is retracted.

Still another object of the invention is to cause movement of the piston to expel the air in the air cylinder chamber by a predetermined differential pressure set up by the pressure media established by the difference in surface area between that of the piston and that of the valve on the piston rod closing the discharge conduit.

A further object of the invention is to provide a limit stop means between the piston and the air cylinder chamber wall opposite the piston.

An additional object of the invention is to provide a bellows diaphragm between the control valve casing body and the piston and respectively connected thereto.

A still further object of this invention is to effect closing of the piston rod carried valve by gravity action, the inlet conduit for the media being located in the control valve casing wall beneath the piston and air cylinder chamber and the discharge conduit being at the bottom of the control valve casing and coaxial with the piston and air cylinder chamber.

Another object of the invention is to form the control valve casing with coaxial inlet and outlet conduits respectively at the top and bottom of the control valve casing, the air cylinder chamber being coaxially mounted within the valve casing to provide an annular passage for the pressure media and coaxial with the inlet and outlet conduits, the piston rod and valve carried thereby; the closing of the discharge conduit being effected both by gravity action due to the weight of the piston, piston rod and valve and the normal pressure of the media.

Still another object of this invention is to provide the air cylinder chamber with a pair of reversely acting solenoid operated valves both air inlet and air discharge, connected by a conduit to the air cylinder, each valve being spring pressed and hold in closed position when the solenoids are energized.

Yet another object of this invention is to provide a spool valve structure either manual or solenoid operated associated with an air line and remote from the control valve, the spool valve being operative to discharge the air from the control valve air cylinder chamber as it is expelled therefrom as well as to permit entry of atmospheric air to the air cylinder chamber.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIG. 1 is a schematic elevational view of an automatic metering flow control valve embodying one form of the invention.

FIG. 2 is a cross-sectional view of a modified form of automatic flow control valve.

FIG. 3 is a cross-sectional view of a further modified form of automatic flow control valve shown in open position.

FIG. 4 is a cross-sectional view similar to that of FIG. 3 showing the valve in closed position.

FIG. 4a is a detail sectional view of a solenoid operated valve unit for use with the control valve of FIG. 3, 4.

FIG. 5 is a cross-sectional view of a manually operated pilot valve usable with any one of the automatic flow control valve of FIGS. 2, 3, and 4.

FIG. 6 is a partial elevational view of the pilot valve of FIG. 5 with a solenoid operating device.

FIG. 7 shows the automatic flow control valve of FIG. 3 with a remote connection to the pilot valve of FIG. 5.

Referring to the drawings in greater detail, the automatic feeder flow control valve 10 of FIG. 1 is seen to consist of a cylindrical casing 11 having a cone shaped bottom wall 12 provided with an axial opening 13. Secured axially to the bottom wall 12 is an outlet conduit 15 in direct communication with the axial opening 13. The upper wall 16 of the cylinder casing 11 is provided with an axial inwardly projecting boss 18 having a bore 19 the upper end portion of which is internally threaded as at 20 for the reception of a threaded screw 21 having its upper end a hand wheel 22. Secured to the wall of casing 11 is inlet conduit 24 which discharges through opening 25 in the casing wall at a location substantially midway between the end walls 12, 16 thereof. Arranged for reciprocation within the cylindrical casing 11 is a piston 27 fixedly carrying an axial stem 28, the piston 27 being normally located above the inlet opening 25. A bellows form of diaphragm 29 is secured at its upper end to the lower side of the piston 27 and at its lower end to the interior surface of the cylinder casing 11 at a location just directly above the inlet opening 25 to provide a lower chamber 30. The lower end of stem 28 carries a cone valve 31 adapted to seat on a suitable seat (not shown) formed at the edge of discharge opening 13. The valve stem 28 which is fixed to the piston 27 has an upper portion 28 that extends above the same into the bore 19 of the boss 18 for limited axial movement therein depending on the movement of the piston 27, as will be hereinafter described. Screw 21 may be adjusted in bore 19 to provide a preset gap and thus limit the extent of upward movement of the piston 27 as well as valve 13 thus controlling the amount of opening of valve 13.

Flowing through inlet conduit 24, cylinder casing 11 and out through discharge conduit 15 may be any suitable fluid or gas under pressure. The space within the cylinder casing 11 above the piston 27 provides an air chamber 32 of varying volumetric capacity. Fixedly carried by the cylinder casing 11 adjacent its upper wall 16 is an air inlet and outlet conduit 34. A port 35 is provided in the wall of casing 11 through which air may flow in either direction from or into the conduit 34. The free outer end of conduit 34 is provided with a spring pressed ball valve 36, 37, opening outwardly by the force of air pressure to be discharged into the atmosphere through opening 38 provided at the end of conduit 34. Arranged on conduit 34 between port 35 and ball valve 36 is a lateral valve housing 40 having therewithin a cone valve 41 mounted on a threaded stem 42 provided with a hand wheel 43, the cone valve 41 having seating engagement on port 44 opening into conduit 34. Provided in valve housing 40 is an inlet port 45. The air inlet valve 41 is adjusted so that the flow of air into the air conduit 34 may be completely shut off or opened to a desired degree for the inward admission of air into chamber 32. The spring 37 acting on ball valve 36 is of such a strength that it will deflect only when a predetermined air pressure is effected in chamber 32 to open valve 36 so as to expel the air therein and to permit the piston 27 to rise, its upper movement being limited when the upper terminal end of valve stem 29 engages the end of screw 21.

It is thus seen from the above description that an automatic cycling feeder valve structure is provided in a flow line. The weight of the piston 27, valve stem 28 and valve 31 acts to close the valve 31 on its seat 13 until the bottom chamber 30 is filled up and a predetermined pressure is built up therein sufficient to elevate the piston 27 and discharge the air in upper chamber 32 through the outlet ball valve 36, thereby opening cone-valve 31 and allowing the liquid and/or gas to enter the discharge conduit 15. The piston 27 is raised because the pressure acting on its larger surface area is greater than that acting against the surface of valve 31. The piston 27 on discharge of the air in chamber 32 after a predetermined interval now moves down by gravity to close cone-valve 31 the downward movement being controlled by the inlet of atmospheric air past valve 41 into upper chamber 32. The setting of valve 41 controls the time for the air to go in and in that way controls the down movement of the piston. This setting is such as to let the liquid and/or gas media discharge past cone-valve 31 before the latter reaches a closed position whereupon the cycle starts again.

FIG. 2 illustrates a modified form of automatic feeder flow control valve structure utilized in lieu of valve 10 but employing the air conduit 34 and its associated valve structure. In this case the valve casing 50 is formed of an upper cylindrical section 51 and a lower cylindrical section 52 having at their opposed open ends mating lateral flanges 54, 55 respectively secured in fluid tight relationship by bolts 56. The upper end of cylindrical section 51 is conical as at 57 and is provided with an axial inlet conduit 58. The lower end of cylindrical section 52 is also formed conical as at 59 and is also provided with an axial discharge conduit 60.

Mounted within the upper cylindrical section 51 is an air cylinder 62 having an open lower end 63 and a conical upper end wall 64, the dimensions of the air cylinder being such as to provide in its axial placement within the upper cylindrical section 51 an annular passage 65 between the same. A plurality of radially extending pins 67 support the air cylinder 62 in its axial position within the upper cylindrical section 51, the pins 67 being press fitted in recesses 68 provided in the wall of the air cylinder and similarly press fitted in openings 69 provided in the wall of the upper cylindrical section 51, as to the latter insuring a fluidtight seal, as shown is FIG. 2. The conical upper end wall 64 of air cylinder 62 is formed solid and is provided with an axial bore 70. The inside surface 72 of the end wall 64 is secured at one side as at 73, and an air discharge sleeve 75 is positioned in fluidtight engagement is an opening 76 provided in the cylindrical wall of the air cylinder and in an opposed coaxial opening 77 in the wall of the upper cylindrical section 51. To insure the fluidtight seal the air discharge sleeve may be press fitted respectively in openings 76 and 77. The air discharge sleeve 75 projects outwardly from the wall of the upper cylindrical section and is adapted to have connected thereto the air inlet and outlet conduit valve structure 34 (shown in detail in FIG. 1).

Reciprocating within air cylinder 62 is a piston 80 provided with an axial rod 81 extending from each side thereof. The lower projecting part of rod 81 provides a valve stem 82 and the upper projecting part provides a guide and limit rod 83 movable within bore 70. Positioned in the lower end of the lower conical end wall 59 of the lower cylindrical section 52 is an annular valve seat 85 adapted to have seated thereon a ball valve 86 fixedly secured to the lower end of valve stem 82. Under the action of gravity due to the weight of the piston 80 and its associated parts the valve 86 will seat on valve 85 closing off the flow of the liquid and/or gas media that enters the automatic feeder flow control valve 50. With the valve 86 in closed position the piston 80 will be at its lowermost point within air cylinder 62 providing above the piston an air chamber 88 comparable to air chamber 32 of FIG. 1. To reduce the volumetric capacity of the lower cylindrical section 52 the wall thereof is flared radially inwardly as at 90 providing a throat 91 of a diameter less than the diameter of the piston. The sloping wall surface 92 of the inside flared wall provides a reaction surface for the pressure of the media within the valve 50 acting on piston 80.

The operation of the automatic valve 50 in the controlled flow of the media therethrough is the same as described above with regard to the valve 10 of FIG. 1. As the pressure of the media rises above a predetermined point the piston 80 will rise in air cylinder 62 discharging the air therein past the conduit ball valve 36. As the piston 80 rises the ball valve 86 is opened allowing a predetermined metered flow of the media into the discharge conduit 60. As described above, the setting of the cone-valve 41 (see FIG. 1) is such as to let the liquid and/or gas media discharge past ball valve 86 before the latter reaches a closed position whereupon the cycle starts again. It is to be noted that when in horizontal level, the closing action of the piston is the media force on the closing valve 86 that moves the piston to a closed position. When open, no pressure exists on the piston back 80. It is to be further noted that, the idea of the inwardly flared walls is to receive a reaction surface for the pressure of the media for the closing valve 86, so that when free to move, the valve will move with the flow, very fast, to closing position.

FIGS. 3 and 4 illustrate a further modified form of automatic feeder flow control valve structure operating in substantially the same manner as the valve 10 (FIG. 1) and the valve 50 (FIG. 2). In this form of construction the valve 100 is seen to consist of an elongated cylindrical body portion 101 having tapered ends 102 and 103 merging respectively into an inlet conduit 104 and an outlet conduit 105. The cylindrical body 101 may be divided either transversely or longitudinally and suitably joined together in the manner as suggested in FIG. 2 so as to facilitate assembly of the parts therewithin. Provided within the cylindrical body 101 is an air cylinder 107 the wall portion of which is in part integral with the top portion 108 of the cylindrical body 101 and in part is spaced from the lower portion 109 thereof to provide a passageway 110. The air cylinder 107 is open at its forward end and is closed by a wall 107' at its rear end. The passageway 110 to one side of the air cylinder 107 is in direct open communication with the inlet conduit 104 ad the outlet conduit 105.

Depending from the upper wall portion 108 of the cylindrical body 101 is a bracket arm 112 having at its lower end a boss 113 provided with a bore 114 coaxial with the axis of air cylinder 107. The bracket arm 112 is located forwardly of the open end of the air cylinder 107. The discharge conduit 105 is arranged such as to be coaxial with the axis of the air cylinder 107 and is provided at its inner end portion with a valve seat 112 for a ball valve 114. Reciprocating within air cylinder 107 is a piston 116. A rod 117 slidably extends through the bore 114 of bracket boss 113 the portion extending rearwardly of the bracket being connected to the piston 116 while the portion extending forwardly constitutes a valve stem connected to ball valve 114. Provided on the inner face of piston 116 is a projecting spacer lug 118 adapted to engage air cylinder wall 107' when the piston is at its rearmost position to provide a clearance space 119, as seen in FIG. 3. With piston 116 in this position the rod or valve stem 117 is retracted with the ball valve 114 in open position off of its seat 112 permitting the flow of the fluid or gas media out of discharge conduit 105. With the ball valve 114 in closed position on its seat 112, the piston 116 is located closely adjacent the open end of the air cylinder as seen in FIG. 4.

Provided in upper wall portion 108 of the cylindrical body 101 in line with clearance space 119, see FIG. 3, is a port 119' to which is connected the air inlet and outlet conduit 34 and its associated valve structure as shown in FIG. 1. The automatic feeder control valve 100 operates in the same manner as described above with reference to valve 10 (FIG. 1) and valve 50 (FIG. 2).

In lieu of the use of the air inlet and outlet valve operating unit 34 there may be connected to discharge port 119' (see FIGS. 4a), a dual solenoid, reversely operated, spring pressed valve structure 34a embodying a conduit 35a connected to port 119' having branch conduits 35b and 35c. Branch conduit 35b is connected to a valve housing 36a having an entrance port 37a closed by a valve 38a pressed down by a spring 39a. Valve 38a has a valve plunger 40a that extends up through housing 36a to a solenoid 41a. Energization of solenoid 41a will hold the valve 38a closed and will when deenergized permit opening of valve 38a against the tension of spring 39a to permit escape of the air in cylinder 107 out through port 41a into the atmosphere when the pressure of the media forces the piston 116 to move rearwardly to expel the air in cylinder 107. Branch conduit 35c is connected to valve housing 36b at entrance port 37b. A partition in valve housing 36b provides a valve seat for a valve 38b which opens towards port 37b and is provided with a spring 39b acting thereagainst. A valve plunger 40b extends up through housing 36b to a solenoid 41b which when energized holds the valve 38b closed on its seat and will when deenergized permit opening of valve 38b to permit entrance of air past the valve into conduits 35c, 35a and port 119' into the piston chamber. The vacuum action set up in cylinder 107 as the piston 116 moves to its forward position under the pressure action of the media on ball valve 114 will cause valve 38b to open against the tension of coil spring 39b. With the cylinder 107 filled with air the spring 39b will act to close valve 38b and energization of solenoid 41b will hold the valve closed until the next cycle is eventuated.

FIGS. 5, 6, and 7 shows the control valve 50 of FIG. 2 employing either a manual or solenoid operated air inlet and discharge pilot valve structure 120, see FIG. 5 remotely located from the control valve utilized in lieu of the air inlet and discharge valve conduit structure 34, see FIG. 1, carried directly by the control valve. The air inlet and discharge pilot valve structure 120 embodies a sleeve 121 provided with an axial bore 122 in which there is slidably positioned a spool valve 124. At its forward end the sleeve 121 is provides with an upstanding ball valve housing 125 connected by a port 125 with the bore 122 of the sleeve. The bottom of valve housing 125 is conical at the top end of port 126 to form a seat 127 for ball valve 128. An air exit port 129 is provided in the ball valve housing 125 adjacent the top wall thereof. At the rear end of sleeve 121 there is provided a depending ball valve housing 130 opening directly as at 131 into the bore 122 of the sleeve, the opening 131 being a port. The lower closed end of the ball valve housing 130 is provided with an air entrance opening 132 (open to the atmosphere) the upper end of which is conically flared as at 133 to seat a ball valve 134. Spaces inwardly from ball valve housing 130 and adjacent and parallel thereto is a depending boss 136 provided with an air inlet and discharge port 137 opening to the atmosphere.

The spool valve 124 is a cylindrical rod having a close sliding fit in bore 122 and is formed with a central reduced diameter portion 140 of a length completely spanning ports 131 and 137, see FIG. 5. At each end of the reduced diameter portion 140 the rod is formed with a circular groove 141, 142 to receive a flexible seal or packing that is air tight. Boss 137 is suitably connected by an air pipe line 145 to the air discharge sleeve 75 of the valve 50, see FIG. 2. The reduced diameter portion 140 of spool valve rod 124 provides an annular flow passage 124' between ports 131 and 137 in the position shown in FIG. 5, and between ports 126 and 137 when the spool valve rod 124 is moved to the right as shown by the dotted line position. When the spool valve rod 124 is in the position shown in FIG. 5 the right portion 147 of the spool valve rod 124 blocks off or closes port 126, thus providing communication between ports 131, 137; and when in the retracted position as shown by the dotted lines, the left portion 148 of the spool valve rod blocks off or closes port 131 and providing communication between port 137 and port 126.

The remotely located pilot spool valve unit 120 is not automatic and is employed generally for manual operation by means (not shown) for moving the spool valve rod 124 to either one of its two positions. The spool valve rod 124 may be of any desired length and project from each end of the sleeve 121, and may include limit stops at each projecting end portion to insure proper placement of the spool valve in either of its two positions. The remote location of the pilot spool valve unit is desirable in situations where the use and location of the control valve 15 is in hazardous area where manual operation in close proximity thereto would be dangerous. If desired one or both ends of the spool valve rod 124 may be solenoid operated as shown by its connection to a solenoid 150. Here again, the remote location of the pilot valve 120 solenoid operated is desirable in situations where no electric current is allowed in the location of the control valve 10.

As the pressure of the media in the control valve rises above a predetermined point (indicated by a pressure gauge or other signalling means) the pilot spool valve rod 124 is moved to its right position thus permitting the air in chamber 88 as the piston 80 moves inwardly into the cylinder 62 to flow out of conduit 75 into the air line 145, annular flow passage 124', port 126 (raising ball valve 128 from its seat into ball valve housing 125 for discharge into the atmosphere through opening 129). Upon restoration of the desired pressure of the media in control valve 50 the pilot spool valve 124 is retracted closing port 126 and permitting seating of ball valve which drops by gravity to its seating position. As the media then acts on the control valve ball valve 86 to move piston 80 down, a vacuum effect is created and air entering port 132 as ball valve 134 is raised passes through annular passage 124' into port 137 and through air line 145 for admission into chamber 80. When the piston 80 reaches its final down position and control valve ball 86 is seated (closed), the ball valve 134 drops to close the air entrance port 132 so that no air can escape as the chamber 80 is then completely filled with air ready for the next cycle of operation of the pilot valve 120 when necessary. The operation of the pilot valve 120 is the same whether manually operated or solenoid operated.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A control valve device in a pipe line conveying a liquid or gas media under pressure comprising:
    a. a valve casing including;
        a'. an upper cylindrical section having a frustoconical upper end wall and an axial inlet conduit,
        b'. the lower end of said upper section being open and having a radial flange,
        c'. a like lower cylindrical section having a frustoconical bottom wall and an axial discharge conduit,
        d'. the upper end of said lower section being open and having a radial flange,
        e'. fastener members connecting said flanges in fluidtight engagement and said inlet and discharge conduits being coaxial,
    b. a cylindrical chamber open at one end opposite the discharge conduit and closed at its other end and coaxially located in said upper cylindrical section,
    c. a plurality of support elements mounting said cylinder chamber in annular spaced relation to the inside wall surface of said upper cylindrical section to provide a flow passage for the media towards the discharge conduit,
    d. a piston movable in said cylinder chamber,
    e. a piston rod constituting a valve stem extending axially from said piston towards said discharge conduit,
    f. said discharge conduit providing a valve seat at the lower end of said lower cylindrical section,
    g. a valve member on the free end of said piston rod arranged to seat on the valve seat of said discharge conduit when the piston is in fully retracted position adjacent to the open end of the cylinder chamber,
    h. the surface area of said piston exceeding the surface area of said valve member, i. an air discharge sleeve extending from the cylinder chamber adjacent its closed end, bridging said annular passage and extending outwardly of the wall of said upper cylindrical section, and j. an air inlet and discharge valved conduit unit including an air inlet valve and an air discharge valve connected to the projecting end of said air discharge sleeve for the discharge and admission of atmospheric air from and into said cylindrical housing, whereby when the pressure media in the pipe line exceeds a predetermined pressure, the increase in differential pressure between the piston and valve member will cause the piston to move inwardly into the cylinder chamber to expel the air therein through said air discharge sleeve into said air inlet and discharge valved conduit unit, the pressure flow of the expelled air acting on the air discharge valve to open the same for discharge of the air into the atmosphere.

2. The control valve device of claim 1, including:
a. a coaxial guide rod extending from the upper side of said piston,
b. the closed end wall of said cylinder chamber having an axial bore for slidably receiving said guide rod,
c. there being a recess formed in said cylinder chamber end wall adjacent the cylinder wall thereof, and
d. said air discharge sleeve having its end portion connected to said cylinder chamber opening into said recess.

3. The control valve device of claim 2, wherein:
a. the wall thickness of the lower casing section increases in thickness towards the upper open end thereof such as to reduce the volumetric capacity of the lower casing section as well as providing a cage for the valve member at the lower end of the piston rod,
b. said valve member being a ball valve which in its closed position seats on the edge of the opening of the discharge conduit at the lower end of the lower casing section.

4. The control valve device of claim 3, wherein:
a. the air inlet valve in said air inlet and discharge conduit unit is adjustable to control the flow of air into said air inlet and discharge conduit unit and into said cylinder chamber, thus controlling the time rate of air flow thereinto and the retraction of the piston, whereby to permit discharge of the media past the valve member before the latter reaches its closed position to thereby establish the control valve device for repetition of its cycle of operation when so required.